United States Patent
Deurloo et al.

(10) Patent No.: US 7,091,671 B2
(45) Date of Patent: Aug. 15, 2006

(54) ELECTRONIC BALLAST WITH RAIL VOLTAGE SWITCHING

(75) Inventors: Oscar J. Deurloo, Rosmalen (NL); Jonathan Hollander, Hod-Hasharon (IL); Dimitry Orlov, Netanya (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/499,159

(22) PCT Filed: Dec. 19, 2002

(86) PCT No.: PCT/US02/40917

§ 371 (c)(1),
(2), (4) Date: Jun. 16, 2004

(87) PCT Pub. No.: WO03/056884

PCT Pub. Date: Jul. 10, 2003

(65) Prior Publication Data

US 2005/0093479 A1 May 5, 2005

Related U.S. Application Data

(60) Provisional application No. 60/342,951, filed on Dec. 21, 2001.

(51) Int. Cl.
*H05B 41/16* (2006.01)

(52) U.S. Cl. .................. 315/247; 315/209 R; 315/274
(58) Field of Classification Search ............... 315/247, 315/246, 224, 225, 209 R, 274, 276, DIG. 4, 315/307, 291
See application file for complete search history.

(56) References Cited

U.S. PATENT DOCUMENTS

| | | | |
|---|---|---|---|
| 5,528,111 A * | 6/1996 | Konopka et al. | 315/291 |
| 5,811,941 A | 9/1998 | Barton | 315/7 |
| 5,969,481 A * | 10/1999 | Konopka | 315/209 R |
| 6,049,179 A * | 4/2000 | Kisaichi et al. | 315/307 |
| 6,157,168 A * | 12/2000 | Malik | 320/128 |
| 6,498,436 B1 | 12/2002 | Hartge et al. | 315/86 |

* cited by examiner

*Primary Examiner*—Tuyet Thi Vo

(57) ABSTRACT

The present invention provides a high frequency electronic ballast with rail voltage switching which adjusts the DC rail voltage output (208) to account for different voltages of mains power (210), improving efficiency. The rail voltage switching comprises a mains power supply (200) providing mains power (210) and a mains voltage signal (212); a ballast microcontroller (206) responsive to the mains voltage signal (212) and generating a power factor correction (PFC) voltage signal (214); and a converter (204) operably connected to the mains power supply (200) and responsive to the PFC voltage signal (214) to generate a DC rail voltage output (208). For an embodiment using power factor control, the converter (204) comprises a coil (218), power factor correction (224), a switch (220), and a rectifier (222).

26 Claims, 13 Drawing Sheets

ELECTRONIC BALLAST WITH RAIL VOLTAGE SWITCHING

CROSS-REFERENCE TO RELATED APPLICATIONS

This application claims priority from International application No. PCT/US02/40917 published on Dec. 19, 2002 and incorporates herein by reference U.S. Provisional Application No. 60/342,951, entitled High Frequency Ballast, filed Dec. 21, 2001.

BACKGROUND OF THE INVENTION

The technical field of this disclosure is high frequency ballast systems, particularly, a high frequency electronic ballast with rail voltage switching.

High Intensity Discharge (HID) lamps, such as mercury vapor, metal halide, high-pressure sodium, and low-pressure sodium, are used for a variety of lighting tasks. As HID lamps have become more popular, electronic ballasts for HID lamps have been developed.

One challenge with electronic ballasts for HID lamps is to improve efficiency. Typically, electronic ballasts receive power from a mains power supply at one mains voltage, which is converted to another DC rail voltage, which is modulated to power the HID lamp. Although the individual electronic ballast is usually designed to operate over a range of mains voltage, the DC rail voltage is held to a set value regardless of the mains voltage. The greater the difference between the mains voltage and the DC rail voltage, the greater the power losses and the lower the efficiency.

It would be desirable to have an electronic ballast with rail voltage switching that would overcome the above disadvantages.

BRIEF SUMMARY OF THE INVENTION

One aspect of the present invention provides an electronic ballast with rail voltage switching.

Another aspect of the present invention provides an electronic ballast with rail voltage switching providing reduced power losses.

Another aspect of the present invention provides an electronic ballast with rail voltage switching providing improved efficiency.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

Figure 1:
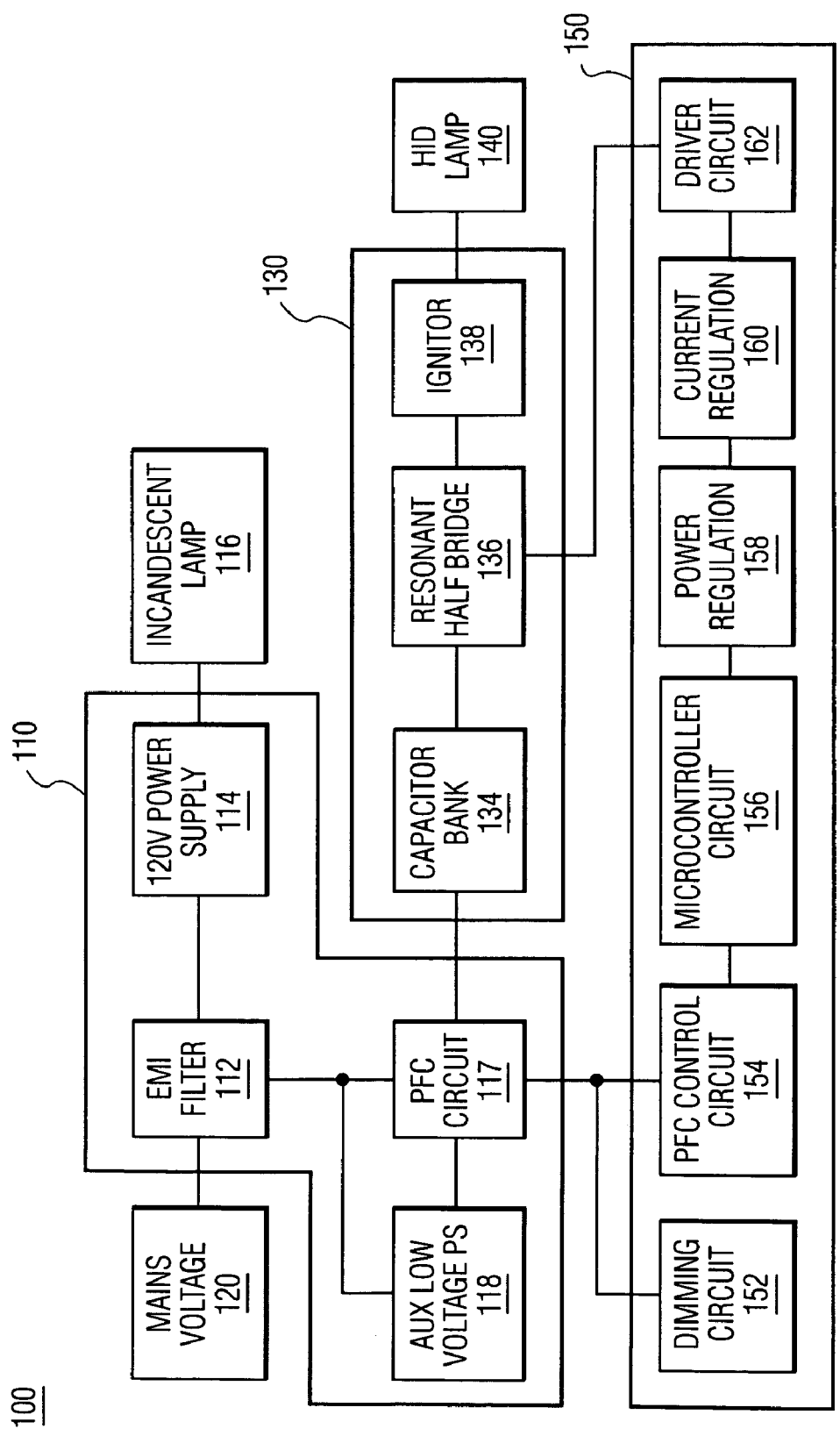
FIG. 1 shows a block diagram of an electronic ballast with rail voltage switching made in accordance with the present invention.

The present invention provides a high frequency electronic ballast with rail voltage switching which adjusts the DC rail voltage output 208 to account for different voltages of mains power 210, improving efficiency. The rail voltage switching comprises a mains power supply 200 providing mains power 210 and a mains voltage signal 212; a ballast microcontroller 206 responsive to the mains voltage signal 212 and generating a power factor correction PFC voltage signal 214; and a converter 204 operably connected to the mains power supply 200 and responsive to the PFC voltage signal 214 to generate a DC rail voltage output 208. For an embodiment using power factor control, the converter 204 comprises a coil 218, power factor correction 224, a switch 220, and a rectifier 222.

FIG. 1 shows a block diagram of an electronic ballast with rail voltage switching made in accordance with the present invention. Some connections between blocks have been omitted for clarity of illustration. The electronic ballast 100 comprises a power supply 110 fed by mains voltage 120, lamp power circuit 130 supplying high intensity discharge (HID) lamps 140, and ballast control circuit 150. The power supply 110 conditions and adjusts power for the electronic ballast 100, the lamp power circuit 130 delivers power to the HID lamps 140, and the ballast control circuit 150 controls the operation of the electronic ballast 100.

The power supply 110 comprises an electro-magnetic interference (EMI) filter 112 on the input of power supply 110, an 120V power supply 114 for powering a back-up incandescent lamp 116, a power factor correction (PFC) circuit 117, and an auxiliary low voltage power supply 118 for powering the ballast control circuit 150. The lamp power circuit 130 comprises a capacitor bank 134, a resonant half bridge 136, and an ignition circuit 138. The ballast control circuit 150 comprises a dimming circuit 152, a power factor correction (PFC) control circuit 154, a microcontroller circuit 156, a power regulation circuit 158, a current regulation circuit 160, and a driver circuit 162.

Figure 2A:
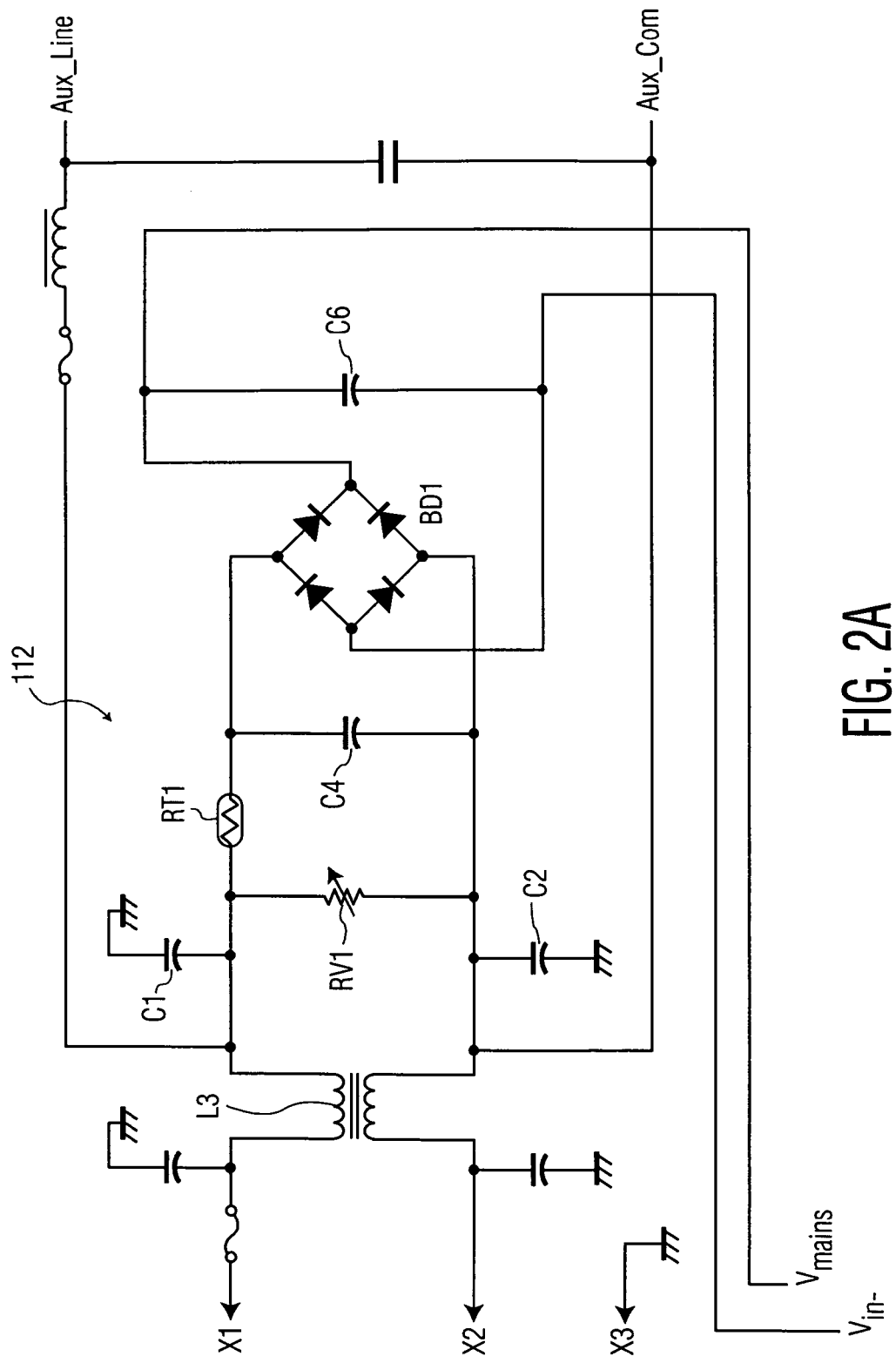
FIGS. 2A–2C show a schematic diagram of a power supply for an electronic ballast with rail voltage switching made in accordance with the present invention.
Figure 2B:
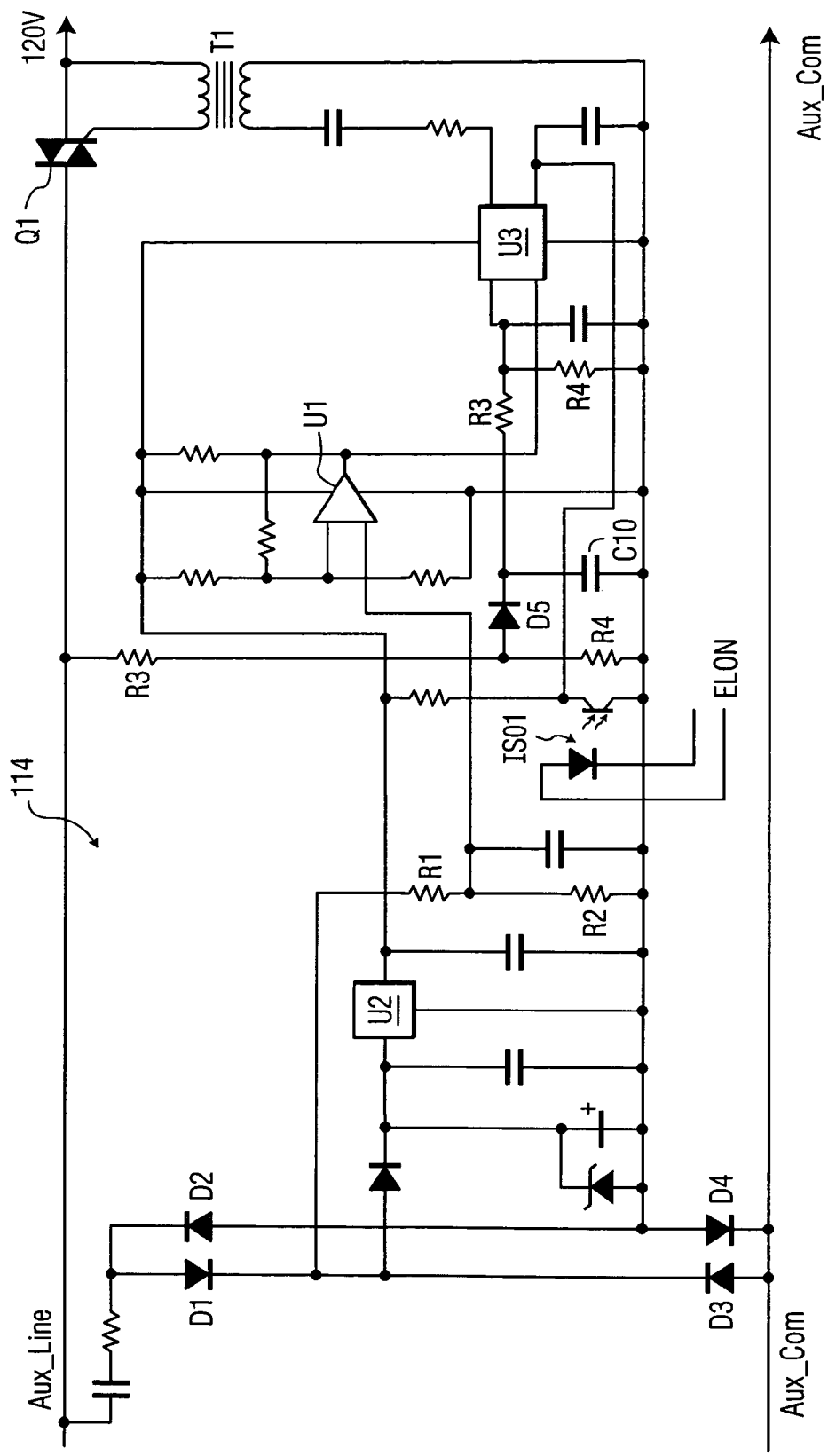
Figure 2C:
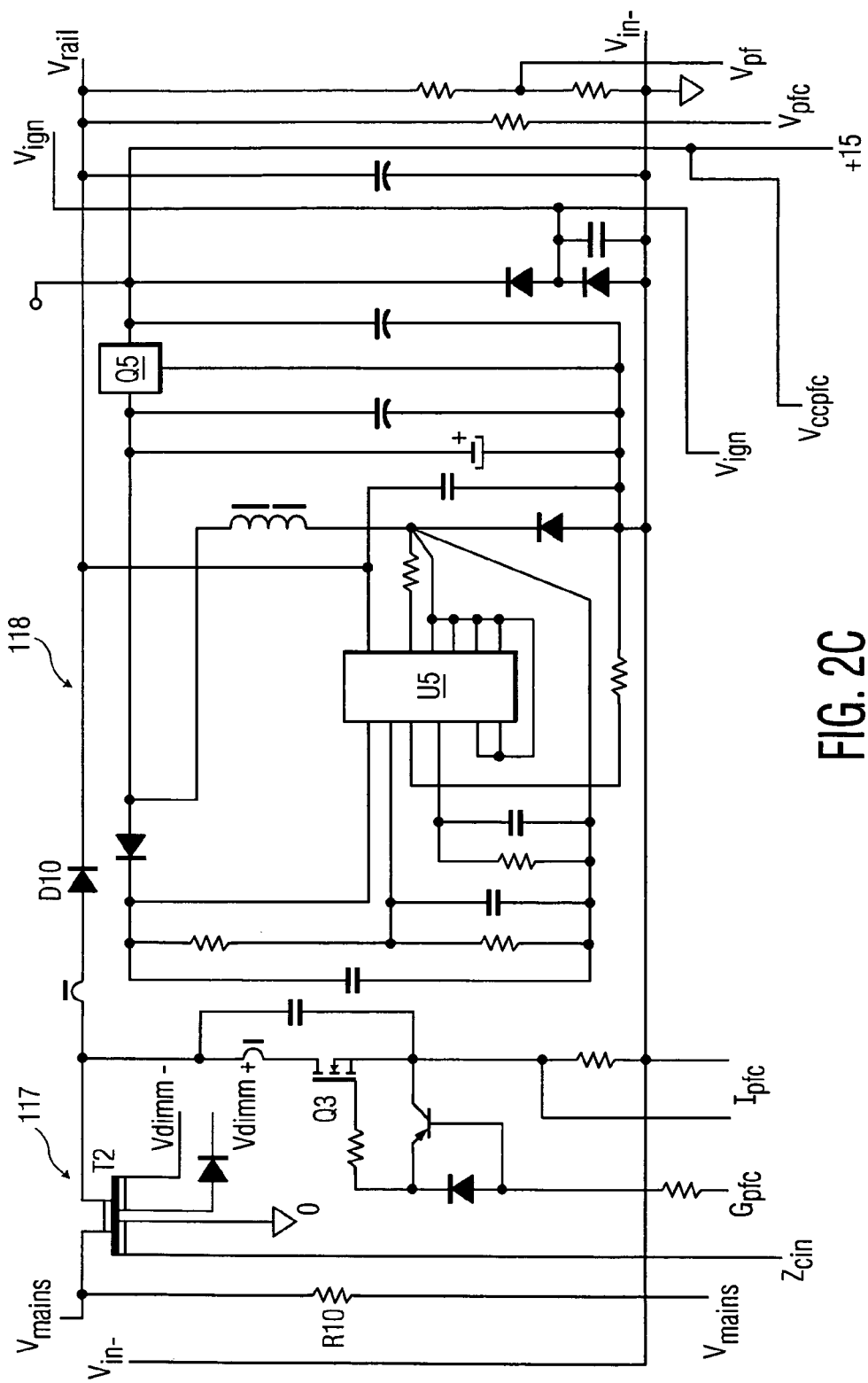

FIGS. 2A–2C show a schematic diagram of a power supply for an electronic ballast with rail voltage switching made in accordance with the present invention. Referring to FIG. 2A, mains voltage is supplied on terminal connections X1, X2, and X3. The mains voltage can vary from about 180V to 305V, and is typically about 200V to 277V. The EMI filter 112 connected to mains voltage comprises transformer L3; capacitors C1, C2, C4, C6; and bridge rectifier BD1. Circuit protection can be provided by inrush current limiter RT1 and voltage suppression varistor RV1. The output of EMI filter 112 continues to the low voltage power supply as the Aux_Line power. An auxiliary line voltage is tapped after transformer L3 to supply the 120V power supply as the mains voltage signal Vmains.

Referring to FIG. 2B, the 120V power supply 114 steps down the 200–277 volt Aux_Line power to 120 volts to provide power to the back-up incandescent lamp. HID lamps have a low light output during warm-up phase, which occurs for about the first minute after power is supplied. HID lamps also need to cool down before they can be reignited, typically for about 5 to 15 minutes. The back-up incandescent lamp supplies lighting when the HID lamp is not burning or burning at a low light level. The back-up incandescent lamp can be a halogen lamp or any other 120V lamp as desired. The 120V power supply 114 is energized anytime the electronic ballast is energized. An ELON signal from the ballast control circuit determines when the 120V power supply 114 supplies power to the back-up incandescent lamp. The ELON signal turns on the light whenever the HID lamp power is less than a predetermined setpoint, such as half nominal HID lamp power, indicating that the HID lamp is not providing substantial light.

The 120V power supply 114 comprises an comparator circuit responsive to an Aux_Line voltage signal and providing a Aux Line zero crossing signal; a 120V microcontroller responsive to the Aux Line zero crossing signal and an Aux Line voltage amplitude signal, and providing a 120V drive signal; and a 120V driver circuit responsive to the 120V drive signal and providing 120V power to the back-up incandescent lamp. The ELON control signal from the ballast control circuit switches the comparator circuit and the 120V microcontroller to turn the 120V power to the back-up incandescent lamp on and off as required.

The full bridge comprising diodes D1, D2, D3, and D4 rectifies the 240–277 volt Aux_Line power. The rectified signal provides an Aux_Line reference signal to comparator U1 after being regulated by voltage regulator U2. The rectified signal also provides a variable Aux_Line voltage signal to the comparator U1 after being scaled by the voltage divider comprising resistors R1 and R2. The comparator U1 compares the Aux_Line reference signal to the Aux_Line voltage signal and provides a Aux Line zero crossing signal to the 120V microcontroller U3. The Aux Line zero crossing signal is used to determine the Aux Line frequency.

The Aux_Line power is scaled by the voltage divider comprising resistors R3 and R4 and provided to the 120V microcontroller U3 as an Aux Line voltage amplitude signal after further conditioning with diode D5, capacitors C10, and resistors R3, R4.

The 120V microcontroller U3 uses the Aux Line zero crossing signal and Aux Line voltage amplitude signal to determine a 120V drive signal for triac Q1. The 120V microcontroller U3 employs a preprogrammed look-up table to look-up the desired timing/phase angle of the triac Q1 based on the Aux Line voltage amplitude signal and corrected for the Aux Line frequency as indicated by the Aux Line zero crossing signal. The 120V drive signal switches the triac Q1 through transformer T1 to provide a well-regulated 120V power to the back-up incandescent lamp. The 120V power supply 114 supplies well regulated 120V power, which will increase the life of the back-up incandescent lamp, and provides over voltage protection to the back-up incandescent lamp.

The ELON control signal from the ballast control circuit switches optical isolator ISO1 to turn the 120V power to the back-up incandescent lamp on and off as required. To turn the 120V power off, optical isolator ISO1 grounds the reference voltage to comparator U1 and the master clear pin on the 120V microcontroller U3.

FIG. 2C shows a schematic diagram of a power factor correction and low voltage power supply for an electronic ballast made in accordance with the present invention. The power factor correction circuit 117 receives the output voltage of the EMI filter and boosts the power supplied to the auxiliary low voltage power supply 118 and the lamp power circuit.

The power factor correction circuit 117 provides a high power factor and low total harmonic distortion. The power factor correction circuit 117 adjusts the rail voltage supplying the lamp power circuit with respect to the mains voltage to reduce the power losses, which would occur by holding a fixed rail voltage independent of the mains voltage. Power factor correction circuit 117 comprises transformer T2, switch Q3, and diode D10. The mains voltage signal Vmains is passed through resistor RIO to provide the mains voltage signal Vmains to the PFC control circuit in the ballast control circuit. The PFC control circuit processes the mains voltage signal Vmains, PFC current signal Ipfc, and PFC voltage signal Vpfc, and returns a PFC gate signal Gpfc to the power factor correction circuit 117. The PFC gate signal Gpfc cycles switch Q3 so that both output voltage requirements and input current requirements are met. In one embodiment, the rail voltage Vrail can be set to discrete values for particular mains voltages. For example, if the mains voltage is below about 210–215 volts, the rail voltage can be set to about 400 volts. Likewise, for mains voltages of about 210 to 255 volts and above about 250 volts, the rail voltage can be set to about 450 volts and about 465–480 volts, respectively. Hysterisis can be used to prevent inadvertent switching of the rail voltage near the mains power voltage setpoints. Those skilled in the art will appreciate that different mains voltage ranges and rail voltages can be used as suited for particular applications. Transformer T2 also provides a zero current input signal ZCin to the PFC control circuit to indicate when current in the transformer T2 has reached zero. Transformer T2 also provides power to the dimming circuit in the ballast control circuit through Vdimm+ and Vdimm−. The power factor correction circuit 117 provides voltage signals to the ballast control circuit through the PFC voltage signal Vpfc and the scaled PFC output voltage signal Vpf.

The auxiliary low voltage power supply 118 provides power to the ballast control circuit components. The auxiliary low voltage power supply 118 takes power from the output of the power factor correction circuit 117 and produces lower voltage power at 15 volts using switched mode power supply IC U5. Voltage regulator Q5 regulates the output from the switched mode power supply IC U5. The output of voltage regulator Q5 provides power to the PFC controller through the Vccpfc line and power to the other ballast control circuit components through the +15 line.

Figure 3:
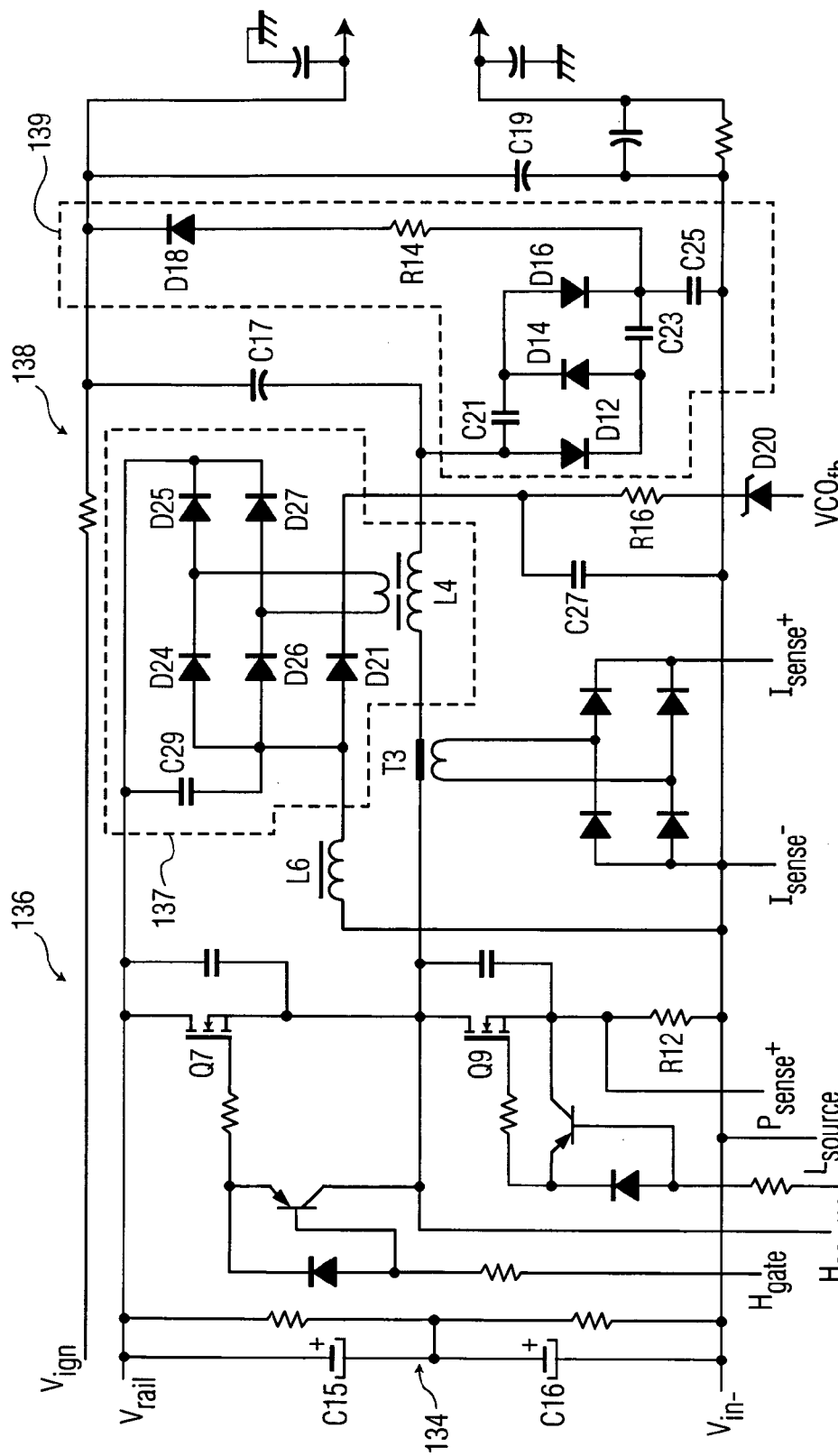
FIG. 3 shows a schematic diagram of a lamp power circuit for an electronic ballast with rail voltage switching made in accordance with the present invention.

FIG. 3 shows a schematic diagram of a lamp power circuit for an electronic ballast with rail voltage switching made in accordance with the present invention. The lamp power circuit 130 comprises capacitor bank 134, resonant half bridge 136, and ignitor 138. Capacitor bank 134 acts as an energy buffer. The resonant half bridge 136 receives power from the EMI filter and converts the power to drive the HID lamp. The ignitor 138 provides a high voltage to the HID lamp during lamp startup.

Capacitor bank 134 on the output of the power factor correction circuit comprises electrolytic capacitors C15 and C16. Resonant half bridge 136 comprises switches Q7, Q9, inductor L4, and capacitor C17. The power to the HID lamp is controlled by the impedance of inductor L4 and capacitor C17, and the frequency of the alternate switching of switches Q7 and Q9 in response to high gate signal Hgate and low gate signal Lgate, respectively. High gate signal Hgate and low gate signal Lgate and their respective grounds, HSource and LSource, are supplied by the ballast control circuit.

Signals from the resonant half bridge 136 also provide information to the ballast control circuit. A lamp power signal Psense+ is provided by measuring the voltage across resistor R12 to indicate the power input to the resonant half bridge 136. A sensed lamp current signal Isense+ to Isense− is provided by measuring the current through the transformer T3 which is mounted in series with inductor L4 and capacitor C17. The voltage for the HID lamp can be determined by dividing the lamp power by the lamp current.

Ignitor 138 comprises DC offset circuit 139 operably connected to the connection of inductor L4 and capacitor C17, clamping circuit 137 operably connected to a secondary winding on inductor L4, and capacitor C19. The ignition voltage for the HID lamp is generated by the resonance between the inductor L4 and the capacitor C19, in conjunction with a DC offset voltage applied to capacitor C17 by the DC offset circuit 139. The resonance is a first harmonic resonance.

The DC offset circuit 139 comprises diodes D12, D14, D16, capacitors C21, C23, C25, resistor R14, and diode D18. The DC offset circuit 139 provides a DC offset voltage to capacitor C17 to reduce currents in switches Q7 and Q9 during generation of the ignition voltage. The magnitude of the DC offset voltage is a fixed ratio of the inductor voltage. The DC offset voltage is controlled by the resonant voltage on inductor L4, which is determined by the current through inductor L4. A feedback loop is provided as transformer T3 measures the current through inductor L4 and provides the sensed lamp current signal Isense+ to Isense− to the ballast microcontroller in the ballast control circuit. The ballast control circuit controls the frequency sweep with the Hgate, Lgate, Hsource, and Lsource signals to switches Q7 and Q9. The DC offset voltage can be set between about 1 kV and 2.5 kV depending on the particular application.

A hardware control/limiting circuit is also provided to control the voltage on inductor L4. The hardware control/limiting circuit comprises coil L6, diode D21, capacitor C27, resistor R16, and zener diode D20. The current through coil L6 generates a voltage that is rectified by diode D21 and filtered by capacitor C27 to produce a voltage controlled oscillator (VCO) feedback signal VCOfb. The VCO feedback signal is provided to the voltage controlled oscillator (VCO) in the ballast control circuit as a feedback control and limit, allowing the ballast control circuit to control the voltage on inductor L4. In one embodiment, the coil L6 is a saturating coil to reduce the effects of switching of the diodes D24, D25, D26, D27.

The clamping circuit 137 comprises a secondary winding of inductor L4, a rectifier bridge of diodes D24, D25, D26, D27, capacitor C29, and diode D21. The clamping circuit 137 conducts if the secondary winding voltage becomes too high, thus limiting the voltage at the inductor L4 to the rail voltage above circuit ground. The winding ratio of the secondary winding of inductor L4 can be used to set the voltage at which the clamping circuit 137 conducts.

In another embodiment, an ignition switch (not shown) responsive to an ignition signal from the ballast control circuit can be provided in series with capacitor C19. The ignition switch can allow the ballast control circuit positive control over the ignition of HID lamp based on the control information provided to the ballast control circuit.

Figure 4A:
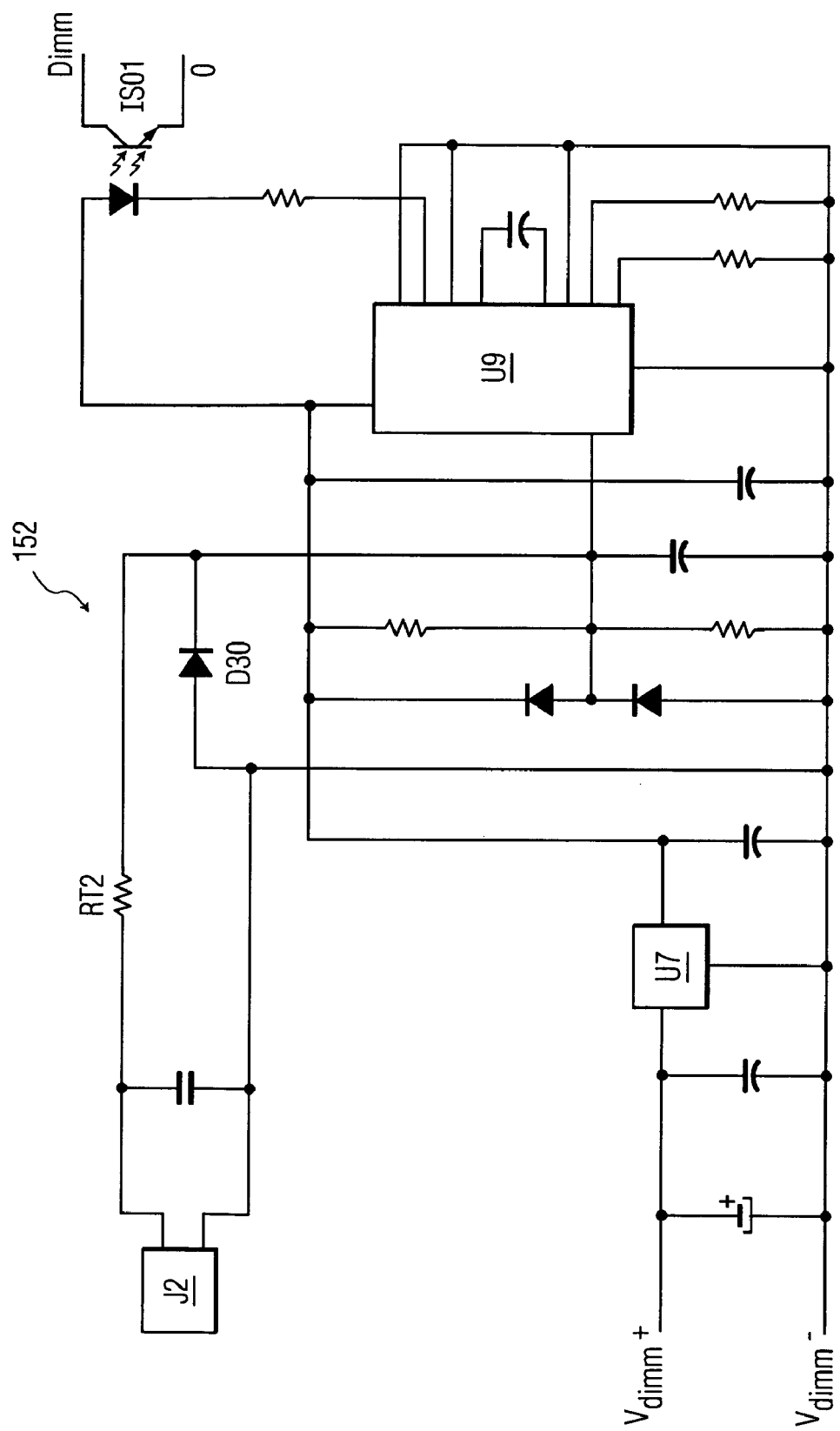
FIGS. 4A–4F show the circuitry of a ballast control circuit for an electronic ballast with rail voltage switching made in accordance with the present invention.

FIGS. 4A–4F show the circuitry of a ballast control circuit for an electronic ballast with rail voltage switching made in accordance with the present invention. FIG. 4A shows a schematic diagram of a dimming circuit for an electronic ballast made in accordance with the present invention. An analog dimming signal is a manually or automatically adjustable input signal received by the dimming circuit 152 at jack J2. The analog dimming signal can be 0–10 volts, or other voltage ranges as required for a particular application. The dimming circuit 152 in the ballast control circuit 150 is protected from high input voltage at jack J2 by positive temperature coefficient (PTC) overcurrent protector RT2 and zener diode D30. The analog dimming signal feeds voltage controlled oscillator U9, which converts the analog dimming signal into a frequency dimming signal Dimm with frequency proportional to the analog dimming signal voltage. The frequency dimming signal Dimm is fed to opto-coupler ISO1, which isolates the dimming circuit 152 output from the microcontroller circuit. The power factor correction circuit provides power to the dimming circuit 152 through Vdimm+ and Vdimm−, with voltage regulator U7 providing voltage stabilization.

Figure 4B:
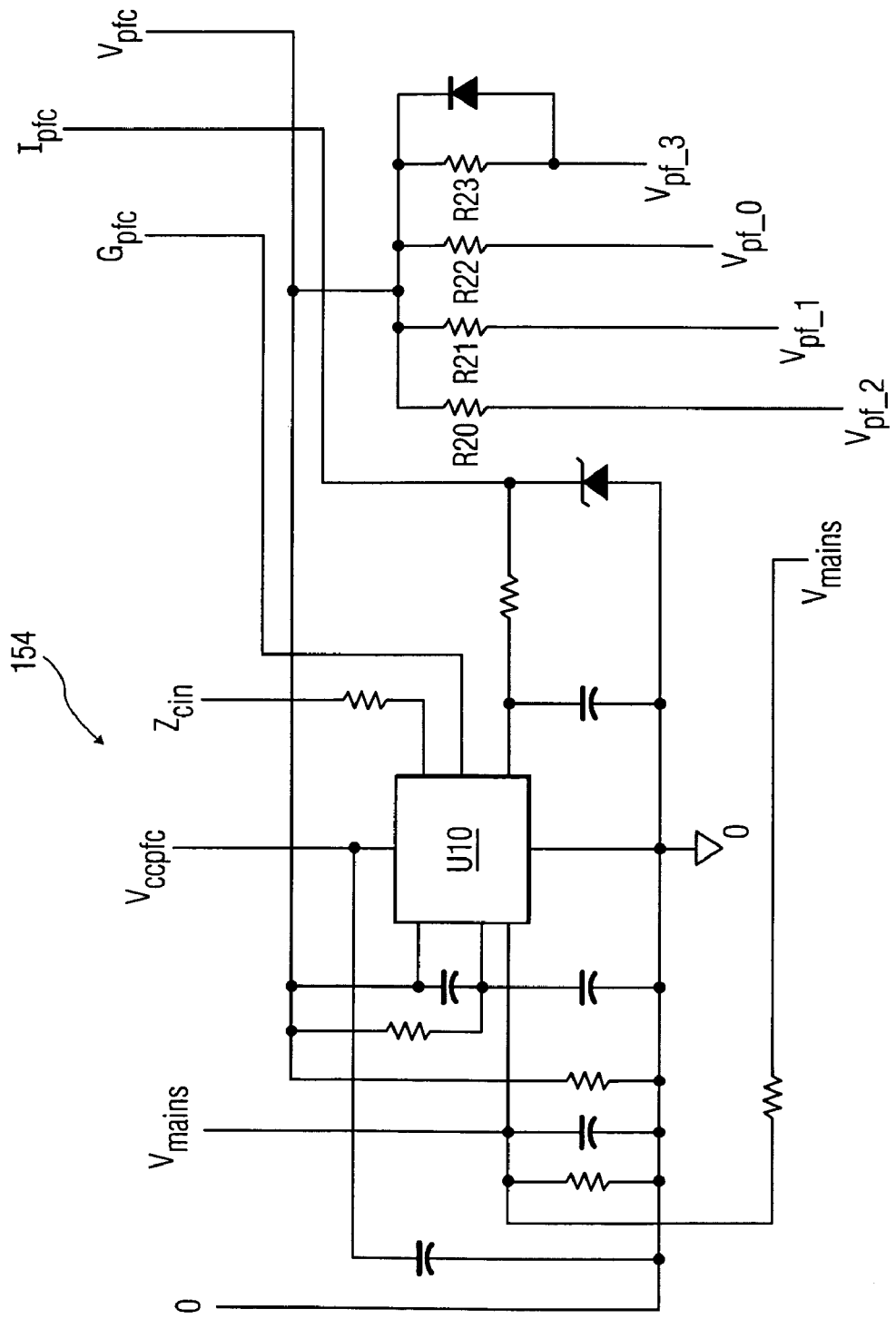

FIG. 4B shows a schematic diagram of a power factor correction (PFC) control circuit 154 in the ballast control circuit 150 for an electronic ballast made in accordance with the present invention. Using power factor correction U10, the PFC control circuit 154 processes the mains voltage signal Vmains, PFC current signal Ipfc, and PFC voltage signal Vpfc from the power factor correction circuit, and returns a PFC gate signal Gpfc to the power factor correction circuit. The PFC control circuit 154 receives a zero current input signal ZCin to indicate when the current in transformer in the PFC circuit has reached zero.

The target rail voltage for a particular mains voltage range is set by the resistor array of resistors R20, R21, R22, and R23. The ballast microcontroller responds to the mains voltage signal Vmains and supplies supply power factor voltage signals Vpf_3, Vpf_2, Vpf_1, and Vpf_0, which switch the various resistors in the resistor array to circuit ground. The resistor array supplies different voltages corresponding to possible rail voltages, which bias the PFC voltage signal Vpfc to the power factor correction U10.

Figure 4C:
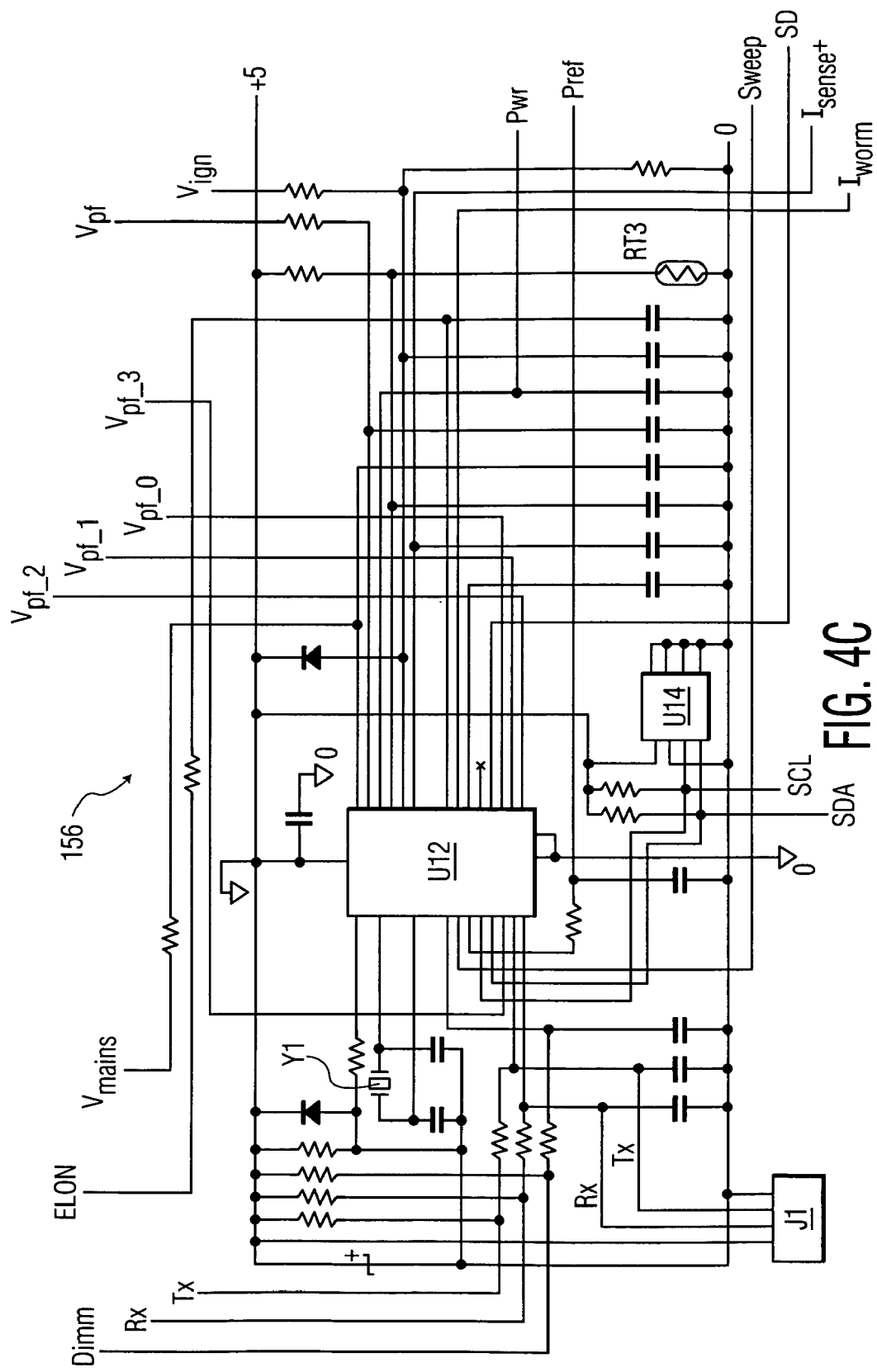
Figure 4D:
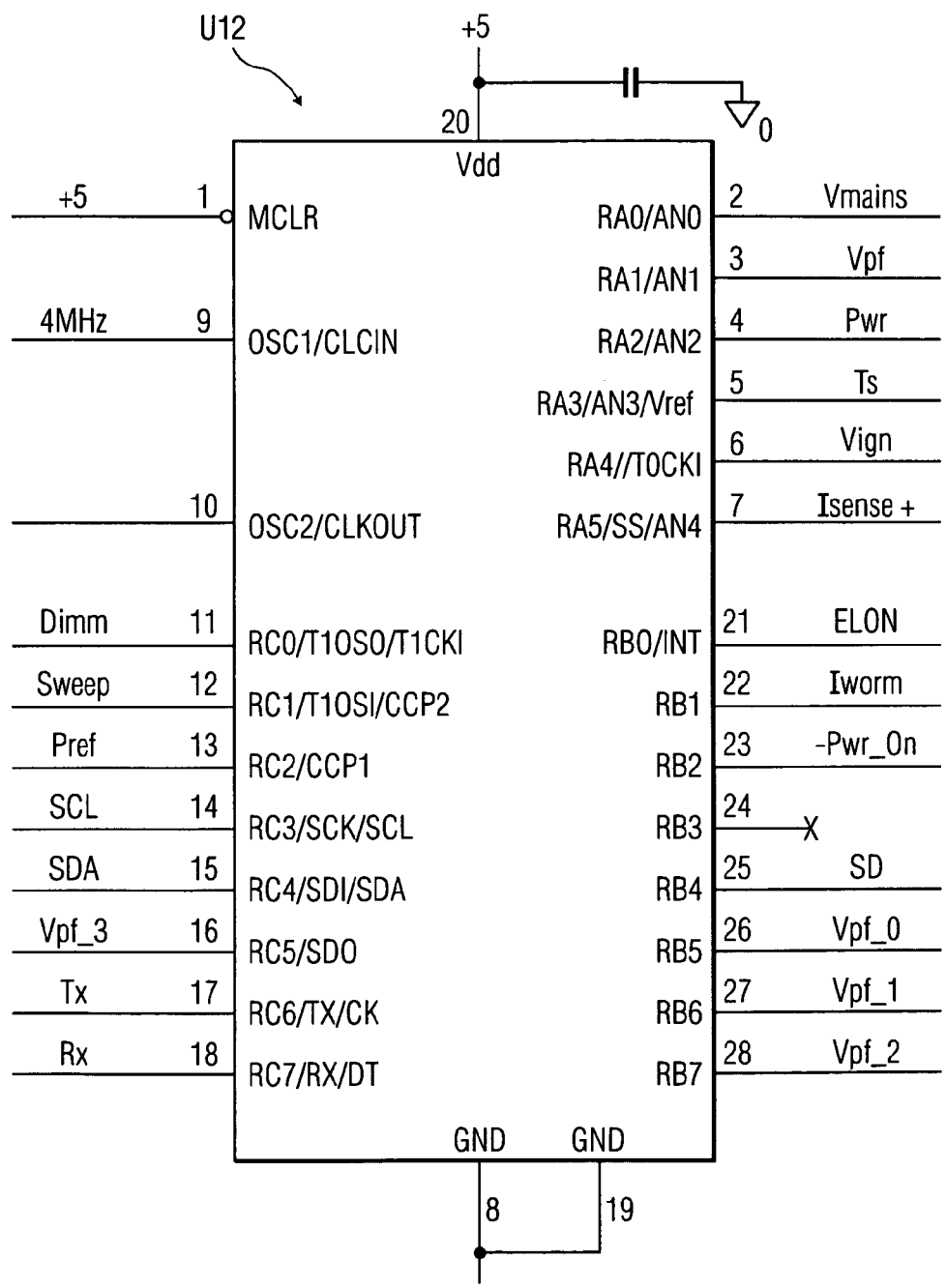

FIGS. 4C & 4D show a schematic diagram of a microcontroller circuit and ballast microcontroller detail, respectively, for an electronic ballast made in accordance with the present invention. The ballast microcontroller U12 is the main control component of the electronic ballast and the ballast control circuit. The microcontroller circuit 156 receives information on the various parameters throughout the electronic ballast and supplies control signals to the various components. Oscillator Y1 provides an oscillating signal, typically about 4 MHz, to the ballast microcontroller U12. Ballast microcontroller U12 receives 5V power from the power regulation circuit, which receives 15V power from the auxiliary low voltage power supply. EEPROM U14 stores information supplied to the ballast microcontroller U12 to tune the electronic ballast to the proper power level, run-up current, and ignition voltage.

The dimming signal Dimm from the dimming circuit is an input to the microcontroller circuit 156 directing the ballast microcontroller U12 to set the power to the HID lamp by adjusting the power reference signal Pref to the power regulation circuit.

The Sweep signal is an output from the microcontroller circuit 156 to the driver circuit to sweep the frequency and generate the required voltage during ignition. The Sweep signal is a function of the ignition voltage signal Vign. The Sweep signal also modulates the lamp current frequency during steady state operation to increase arc stability. The steady state operation is described in U.S. patent application Ser. No. 10/043,586, assigned to the same assignee as the present application and incorporated herein by reference.

The power reference signal Pref is an output from the ballast microcontroller U12 and provides the power regulation circuit with the power reference signal with which to compare the processed sensed power signal to adjust the output of the HID lamp. The power reference signal Pref controls the HID lamp power and is a function of measured rail voltage Vpf and sensed power signal Pwr. The power reference signal Pref can also be a function of the frequency dimming signal Dimm and the calibration constant from EEPROM U14. The SCL and SDA signals communicate stored information from EEPROM U14, such as power level, run-up current, and ignition voltage, to the ballast microcontroller U12.

The supply power factor voltage signals Vpf_3, Vpf_2, Vpf_1, and Vpf_0 are outputs from the ballast microcontroller U12 providing circuit grounds to the resistor array in the PFC control circuit to set the target rail voltage. The grounding of Vpf_3, Vpf_2, Vpf_1, and Vpf_0 is a function of mains voltage Vmains.

The Tx and Rx signal provide communication between the ballast microcontroller U12 and devices external to the electronic ballast through port J1 using an RS232 interface protocol.

The input voltage signal Vmains is an input to the ballast microcontroller U12 from the PFC control circuit 154 and indicates the mains voltage level. The input voltage signal Vmains determines the ballast microcontroller U12 setting the output for the supply power factor voltage signals Vpf_3, Vpf_2, Vpf_1, and Vpf_0.

The scaled PFC output voltage signal Vpf is an input to the ballast microcontroller U12 from the power factor correction circuit 117 and indicates the rail voltage.

The processed power signal Pwr is an input to the ballast microcontroller U12 from the power regulation circuit and indicates the power to the HID lamp. The processed power signal Pwr divided by the lamp current signal Isense+ provides the HID lamp voltage. The processed power signal Pwr, scaled PFC output voltage signal Vpf, a calibration constant from EEPROM U14, and Dimming signal Dimm are used to determine power reference signal Pref, which controls the HID lamp power.

The temperature signal Ts is an input to the ballast microcontroller U12 from the overcurrent protector RT3 of the microcontroller circuit 156 and indicates the temperature of the electronic ballast. The temperature signal Ts can be used by the ballast microcontroller U12 to determine that the electronic ballast should be shut down to avoid damage: the ballast microcontroller shuts down the electronic ballast by toggling the shutdown signal SD.

The ignition voltage signal Vign is an input to the ballast microcontroller U12 from the ignitor and indicates the voltage supplied to the HID lamp for ignition. The ignition voltage signal Vign can be used by the ballast microcontroller U12 to determine the magnitude of the sweep signal Sweep to start the HID lamp.

The lamp current signal Isense+ is an input to the ballast microcontroller U12 from the current regulation circuit, which receives the signal from the resonant half bridge. The lamp current signal Isense+ indicates the current to the HID lamp and is used to control runup current limit signal Iworm. The lamp current signal Isense+ is also used to calculate lamp voltage, which can be used for such functions as determining fault situations.

The ballast microcontroller U12 can determine voltage for the HID lamp by dividing the processed power signal Pwr by the lamp current signal Isense+. The ballast microcontroller U12 can use the processed power signal aPwr, current signal Isense+, and calculated HID lamp voltage to determine the magnitude of power reference signal Pref to control the HID lamp. The power reference signal Pref can also be a function of the frequency dimming signal Dimm and the calibration constant from EEPROM U14.

The ELON signal is an output from the ballast microcontroller U12 to the 120V power supply and determines when the 120V power supply supplies power to the back-up incandescent lamp. The ELON signal turns off the back-up incandescent lamp whenever the HID lamp power, as indicated by the Pwr signal to the ballast microcontroller U12, reaches a predetermined setpoint. A predetermined setpoint, such as about 50% nominal HID lamp power, can be used to indicate the point where the HID lamp provides substantial light.

The run up current limit signal Iworm is an output from the ballast microcontroller U12 to the voltage controlled oscillator of the driver circuit. The run up current limit signal Iworm sets the lamp current limit level and is required at low HID lamp voltages to limit run up current. The run up current limit signal Iworm is a function of lamp current signal Isense+, which indicates the current to the HID lamp.

The inverse power on signal −Pwr_On is the power up/reset signal for initializing the ballast microcontroller U12.

The shutdown signal SD is an output from the ballast microcontroller U12 to the high and low side driver of the driver circuit. The shutdown signal SD turns off the HID lamp on fault conditions, such as no lamp ignition, lamp voltage outside range, ballast temperature high, and mains voltage low.

Figure 4E:
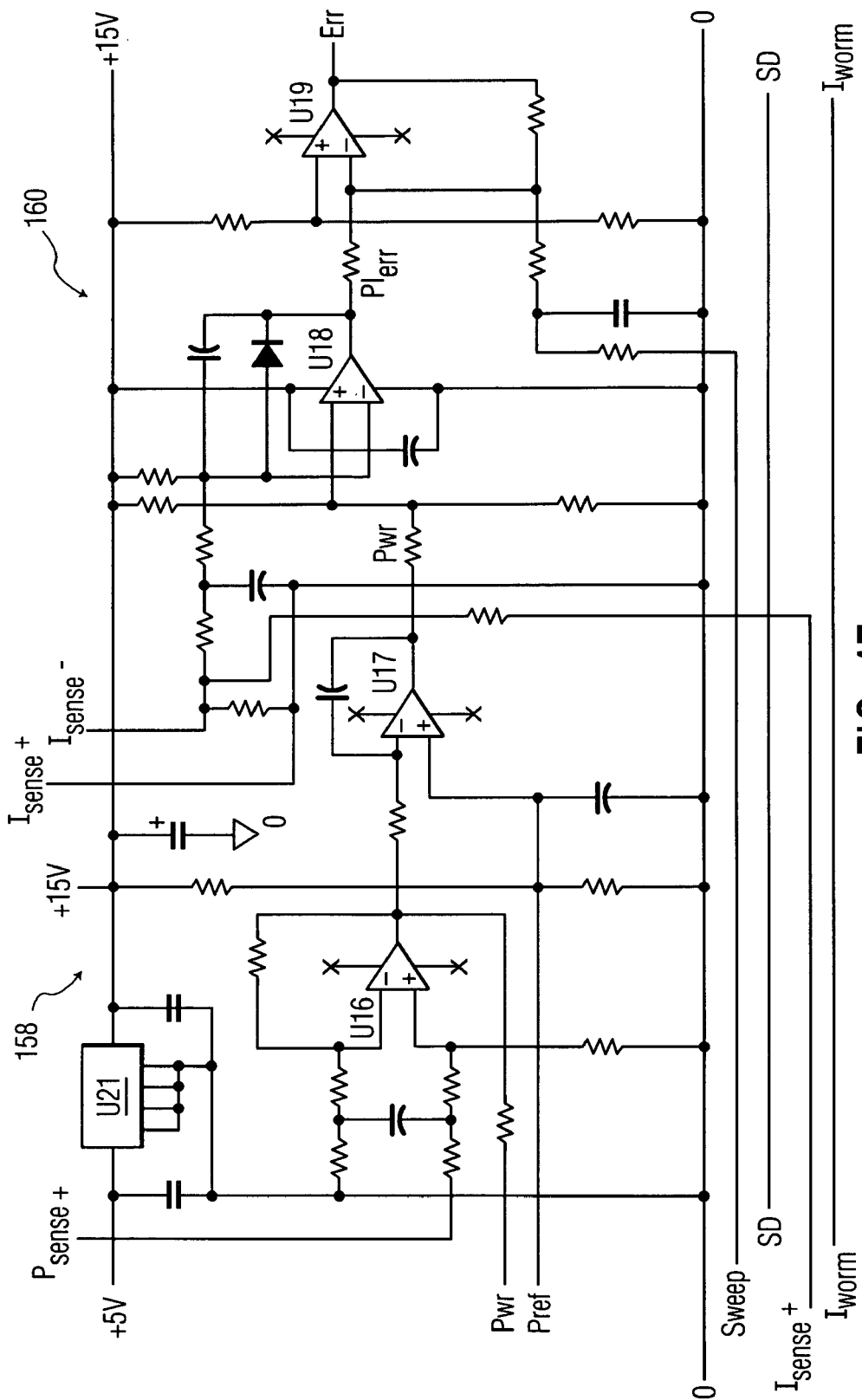

FIG. 4E shows a schematic diagram of power regulation circuit 158 and current regulation circuit 160 for an electronic ballast made in accordance with the present invention. The power regulation circuit 158 compares a sensed lamp power signal to a power reference signal to determine a power error signal, which is passed to the current regulation circuit 160. The current regulation circuit 160 uses the power error signal and sensed lamp current to determine a total error signal, which is passed to the driver circuit 162.

The power regulation circuit 158 includes operational amplifiers U16 and U17. Operational amplifier U16 receives lamp power signal Psense+ which indicates the power through switch Q9 of the resonant half bridge (see FIG. 3). Operational amplifier U16 regulates and limits the lamp power signal to produce a processed power signal Pwr, which is supplied to the operational amplifier U17 and also to the microcontroller circuit. Operational amplifier U17 compares the processed power signal Pwr to the power reference signal Pref from the microcontroller circuit to produce a power error signal Perr, which is supplied to the current regulation circuit 160. The power regulation circuit 158 also includes voltage regulator U21 to supply power to the microcontroller circuit.

The current regulation circuit 160 includes operational amplifiers U18 and U19. Operational amplifier U18 compares the power error signal Perr to the sensed lamp current signal Isense+ from the resonant half bridge to produce a power/current error signal PIerr, which is supplied to the operational amplifier U19. Operational amplifier U19 regulates and limits the power/current error signal PIerr and produces a total error signal Err, which is supplied to the driver circuit.

The sweep signal Sweep from the microcontroller circuit to the operational amplifier U19 sweeps the frequency and generates the required voltage during ignition and modulates the lamp current frequency during steady state operation to increase arc stability. The steady state operation is described in U.S. patent application Ser. No. 10/043,586, assigned to the same assignee as the present application, and incorporated herein by reference.

Figure 4F:
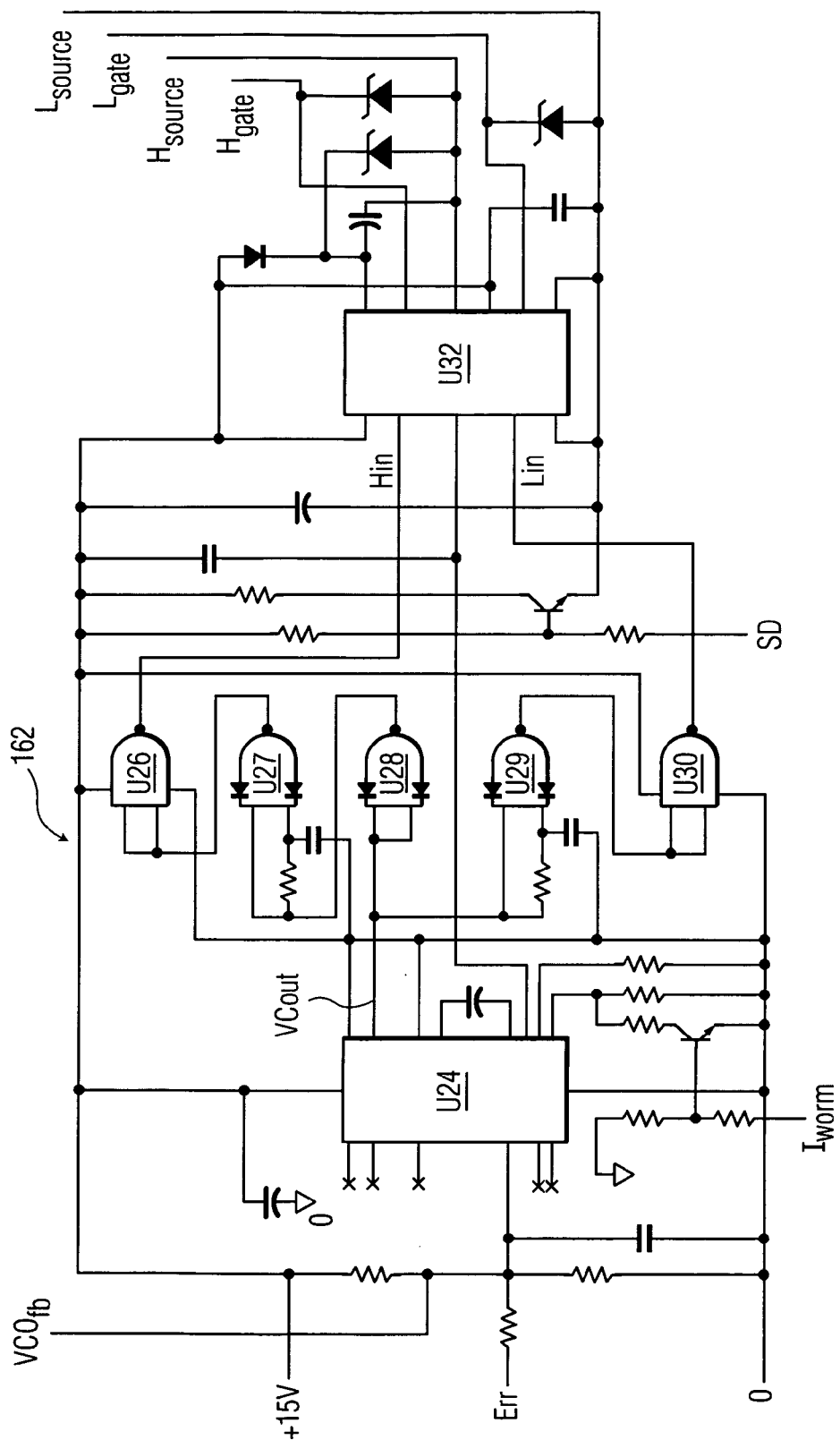

FIG. 4F shows a schematic diagram of a driver circuit 162 for an electronic ballast made in accordance with the present invention. The driver circuit 162 receives the total error signal Err from the current regulation circuit indicating the desired power to be supplied to the HID lamp and provides high gate signal Hgate and low gate signal Lgate to the resonant half bridge to control power to the HID lamp.

The driver circuit 162 comprises voltage controlled oscillator (VCO) U24, driver gates U26, U27, U28, U29, U30, and high and low side driver U32. VCO U24 receives the total error signal Err from the current regulation circuit and provides a clocked VCO output signal VCOUT proportional to the voltage of the total error signal Err. The runup current limit signal Iworm or the run shutdown signal SD from the microcontroller circuit can shut down the VCO U24 to turn off the HID lamp, if required.

The driver gates receive the VCO output signal VCOUT, which passes through three driver gates U26, U27, U28 to produce the high input signal Hin and through two driver gates U29 and U30 to produce the low input signal Lin. The use of an odd number of driver gates to produce the high input signal Hin and an even number of driver gates to produce the low input signal Lin results in the high input signal Hin and the low input signal Lin having opposite polarity with deadtime between the two signals.

High and low side driver U32 regulates the high input signal Hin and the low input signal Lin from the driver gates and provides the high gate signal Hgate and low gate signal Lgate to the resonant half bridge. The run shutdown signal SD from the microcontroller circuit can shut down the VCO U24 to turn off the HID lamp, if required.

Figure 5A:
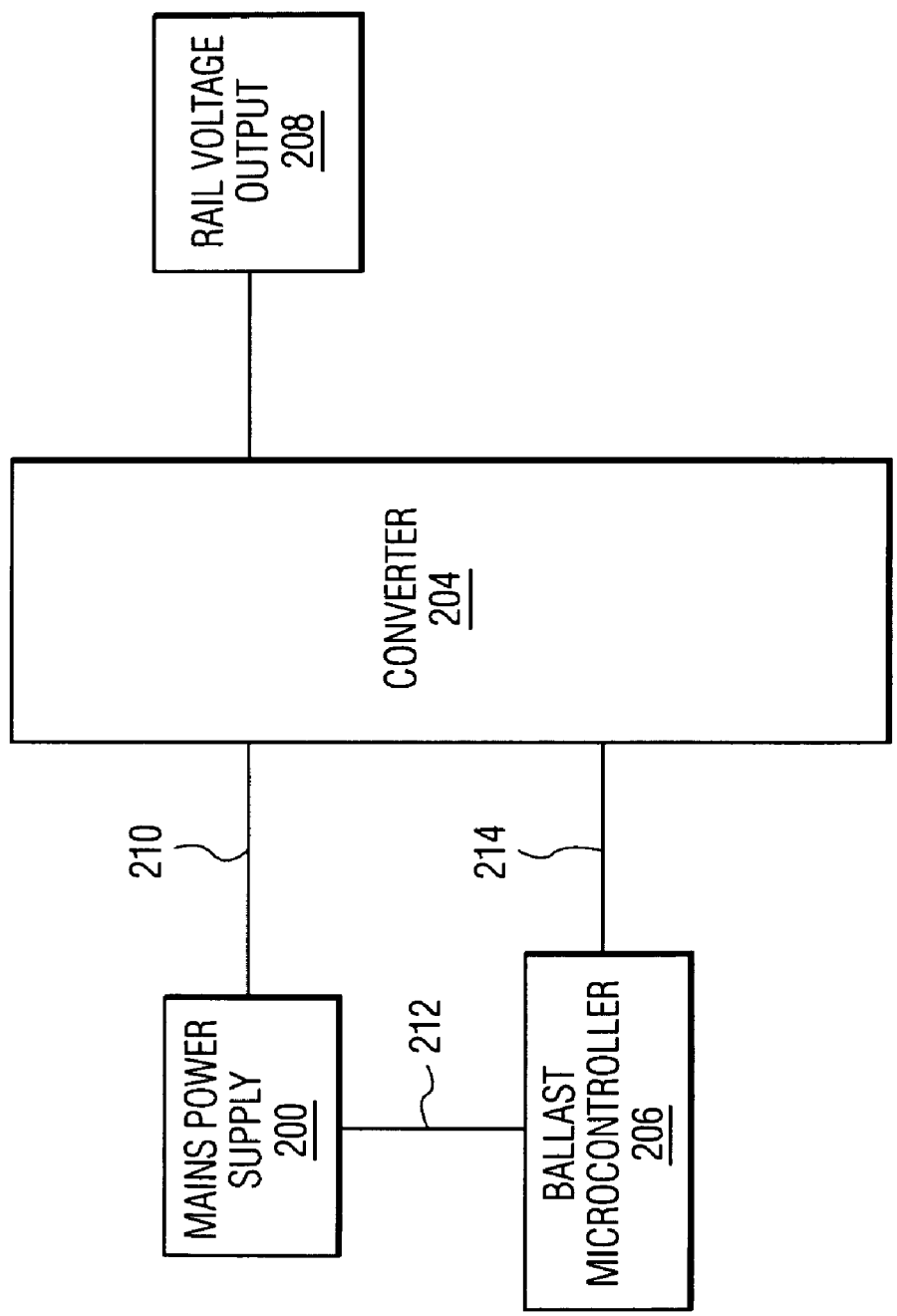
FIGS. 5A–5B show block diagrams of a rail voltage switching circuit for an electronic ballast with rail voltage switching made in accordance with the present invention.
Figure 5B:
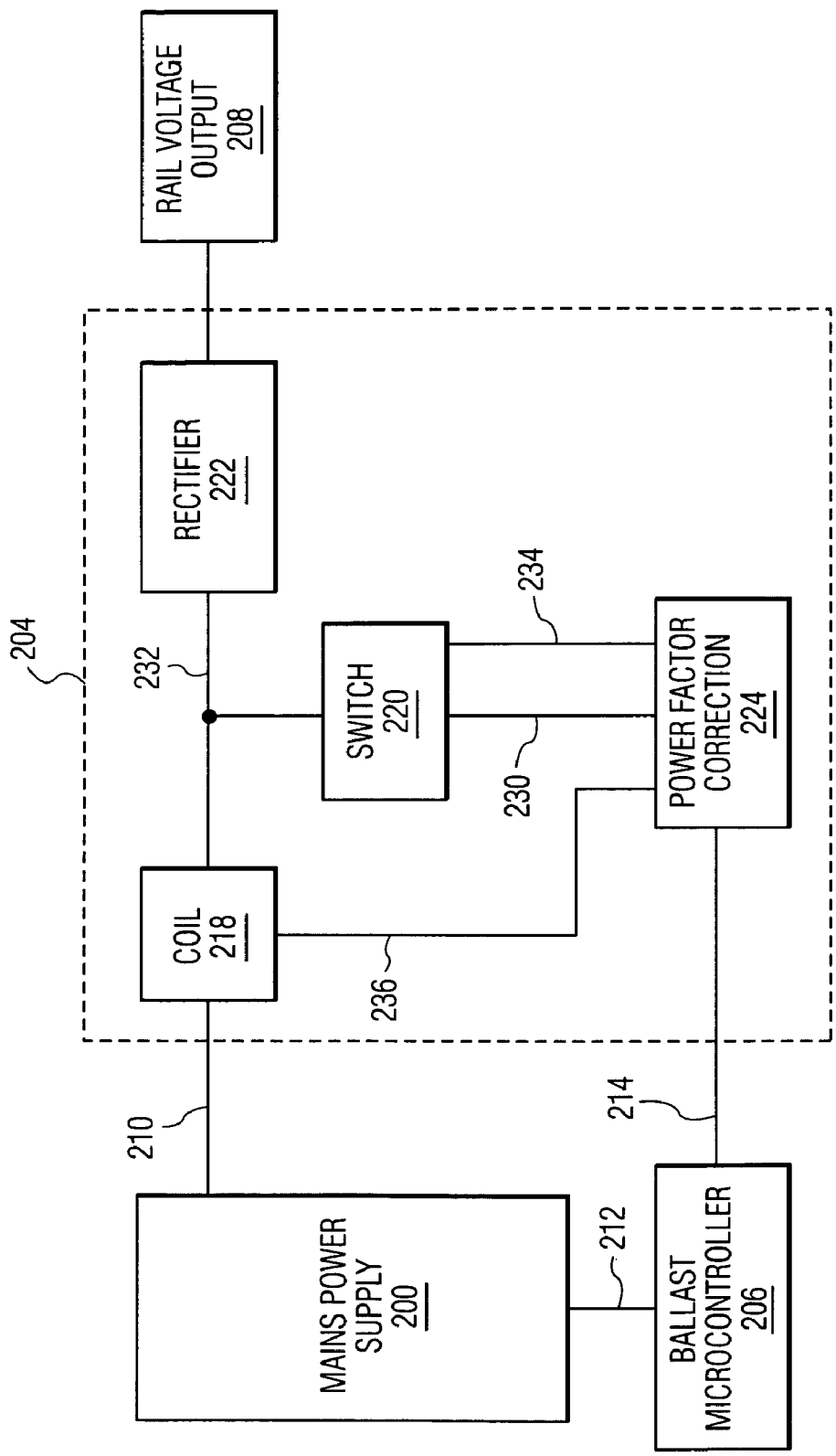

FIGS. 5A–5B show block diagrams of a rail voltage switching circuit for an electronic ballast with rail voltage switching made in accordance with the present invention. Referring to FIG. 5A, the mains power supply 200 is an AC or DC power supply providing mains power 210 to converter 204. Ballast microcontroller 206 is responsive to mains voltage signal 212 from the mains power supply 200 and provides a power factor correction (PFC) voltage signal 214 to the converter 204. The converter 204 provides a DC rail voltage output 208, which can be modulated to drive an HID lamp.

The mains power supply 200 provides mains power 210 to converter 204. The mains power supply 200 can be any AC or DC power supply providing power for a single electronic ballast or a group of electronic ballasts. The nominal voltage from the mains power supply 200 can vary depending on the power supplied by the local electric utility and the local power distribution network. The actual voltage can vary with time, depending on the power demand on the local electric utility and the local power distribution network. In most locations, the mains voltage can vary from about 180 VAC to 305 VAC, and is typically about 200 VAC to 277 VAC. The mains voltage signal 212 provides the voltage of the mains power supply 200 to the ballast microcontroller 206.

The ballast microcontroller 206 is any control device responsive to a mains voltage signal 212 and providing a PFC voltage signal 214, such as a PIC16C73B 8-Bit CMOS microcontroller manufactured by Microchip Technology Inc. In one embodiment, the ballast microcontroller 206 stores constants and performs calculations to determine the desired PFC voltage signal 214 for a given mains voltage signal 212. In another embodiment, the ballast microcontroller 206 can store a look-up table correlating and providing the desired PFC voltage signal 214 for a given mains voltage signal 212. The PFC voltage signal 214 is provided to the converter 204.

The converter 204 is responsive to the PFC voltage signal 214, and using mains power 210, provides a DC rail voltage output 208. The converter 204 can be any switched mode converter able to convert the mains power 210 to a DC output at the desired voltage and quality. Typical converter devices and topologies are buck converters, boost converters, buck-boost converters, flyback converters, single ended primary inductor converters (SEPIC), and Cuk converters. Those skilled in the art will appreciate that a number of converter devices and topologies are appropriate for a particular application.

The ballast microcontroller 206 determines where the DC rail voltage output 208 should be set for the given mains voltage by selecting the appropriate PFC voltage signal 214 for a particular mains voltage. The DC rail voltage output 208 can be set to discrete values for particular mains voltages. The ballast microcontroller 206 can supply one PFC voltage signal 214 for each particular range of mains voltage signals 212. Those skilled in the art will appreciate that the possible mains voltage range can be divided into as many mains voltage ranges as desired for a particular application. Typically, the DC rail voltage output can be set lower for a lower mains voltage and higher for a higher mains voltage. If a large number of mains voltage ranges are used, the DC rail voltage output can approximate a continuous function of the mains voltage. Hysteresis can be used to keep the DC rail voltage output from repeatedly and inadvertently switching when the mains voltage signal is near a mains power setpoint.

In one example using two mains voltage ranges, the range of possible mains voltages can be divided into a first mains voltage range below mains power setpoint $V_1$, and a second mains voltage range above mains power setpoint $V_1$. If the mains voltage falls in the first mains voltage range, the DC rail voltage output 208 is set to a first DC rail voltage output, and if the mains voltage falls in the second voltage range, the DC rail voltage output 208 is set to a second DC rail voltage output.

In another example using three mains voltage ranges, the range of possible mains voltages can be divided into a first mains voltage range below first mains power setpoint $V_1$, a second mains voltage range from first mains power setpoint $V_1$ to second mains power setpoint $V_2$, and a third mains voltage range above second mains power setpoint $V_2$. If the mains voltage falls in the first mains voltage range, the DC rail voltage output 208 is set to a first DC rail voltage output. If the mains voltage falls in the second or third mains voltage range, the DC rail voltage output 208 is set to a second or third DC rail voltage output, respectively.

For an example using three mains voltage ranges illustrating typical voltage values, for a mains voltage below a first mains power setpoint $V_1$ of about 210–215 volts, the DC rail voltage output can be set to about 400 volts. For a mains voltage between a first mains power setpoint $V_1$ of about 210–215 volts and a second mains power setpoint $V_2$ of about 255 volts, the DC rail voltage output can be set to about 450 volts. For a mains voltage above a second mains power setpoint $V_2$ of about 250 volts, the DC rail voltage output can be set to about 465 to 480 volts. Those skilled in the art will appreciate that different mains voltage ranges and DC rail voltage outputs can be used for particular applications.

Hysteresis can be used regardless of the number of mains voltage ranges to keep the DC rail voltage output from repeatedly and inadvertently switching when the mains voltage signal 212 is near a mains power setpoint. For example, the DC rail voltage output 208 can change from a first DC rail voltage output to a second DC rail voltage output at a mains power setpoint $V_1$ as the mains voltage increases, and not switch from the second DC rail voltage output to the first DC rail voltage output until the mains voltage reaches $V_1$ less an offset when the mains voltage decreases. For a mains voltage operating at about 200–277 volts and an electronic ballast with rail voltage switching using three mains voltage ranges, a hysteresis of 20–30 volts can be used.

FIG. 5B, in which like elements share like reference numbers with FIG. 5A, shows a block diagram of a rail voltage switching circuit for an electronic ballast with rail voltage switching and using power factor correction made in accordance with the present invention. In this example, the converter 204 is a boost topology converter and comprises coil 218, switch 220, rectifier 222, and power factor correction 224. The input of coil 218 receives mains power 210 from the mains power supply 200 and the output of coil 218 is operably connected to switch 220 and rectifier 222. The power factor correction 224 is responsive to PFC voltage signal 214 and provides a PFC gate signal 230 to switch 220. The switch 220 switches the output of coil 218 between common and open in response to the PFC voltage signal 214 to provide modulated power 232 to the rectifier 222, which provides the DC rail voltage output 208. The switch 220 can be a MOSFET, switching transistor, insulated gate bipolar transistor (IGBT), or any switching device. An exemplary MOSFET is the STP11NM60 manufactured by STMicroelectronics. The rectifier 222 can be a diode, full bridge rectifier, half bridge rectifier, or other rectifying device as desired for a particular application. An exemplary bridge rectifier is the KBU4J manufactured by Fairchild Semiconductor.

A zero current input signal 236 indicates coil current from the coil 218 and is provided to the power factor correction 224. In this embodiment, the power factor correction 224 operates in the critical conduction mode, switching switch 220 in response to zero coil current from the coil 218. This provides an improved power factor as the current waveform follows the voltage waveform of the mains power supply 200.

An optional PFC current signal 234 monitoring the current through the switch 220 and provided to the power factor correction 224 can be used as a current feedback control for the converter 204. In this embodiment, the power factor correction 224 is responsive to the PFC current signal 234, along with the PFC voltage signal 214, and uses both signals to determine the PFC gate signal 230.

One particular embodiment of an electronic ballast with rail voltage switching and using power factor correction is provided in FIGS. 2C, 4B, and 4C. Referring to FIG. 2C, mains power is supplied through transformer T2 of power factor correction circuit 117, which acts as a coil. Zero current input signal Zcin taps off a secondary winding of transformer T2 and is supplied to the PFC control circuit. Switch Q3 is responsive to PFC gate signal Gpfc to switch the output of the transformer T2 to diode D10, producing a DC rail voltage output. The PFC current signal Ipfc monitoring the current through switch Q3 is provided to the power factor correction. Referring to FIG. 4C, the ballast microcontroller U12 of microcontroller circuit 156 is responsive to mains voltage signal Vmains and provides supply power factor voltage signals Vpf_0, Vpf_1, Vpf_2, and Vpf_3. Ballast microcontroller U12 switches the individual supply power factor voltage signals depending on the mains power supply voltage. Referring to FIG. 4B, the supply power factor voltage signals Vpf_0, Vpf_1, Vpf_2, and Vpf_3 provide PFC voltage signal Vpfc to power factor correction U10 of PFC control circuit 154, which provides PFC gate signal Gpfc to switch Q3. The power factor correction U10 is also responsive to zero current input signal Zcin and PFC current signal Ipfc.

It is important to note that FIGS. 1–5 illustrate specific applications and embodiments of the present invention, and are not intended the limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A rail voltage switching circuit for an electronic ballast comprising:
    a mains power supply (200), the mains power supply (200) providing mains power (210) and a mains voltage signal (212);
    a ballast microcontroller (206), the ballast microcontroller (214) being responsive to the mains voltage signal (212) and generating a power factor correction (PFC) voltage signal (214); and
    a converter (204), the converter (204) being operably connected to the mains power supply (200) and being responsive to the PFC voltage signal (214) to generate a DC rail voltage output (208), the DC rail voltage output (208) being a first DC rail voltage output if the mains power (210) is within a first mains voltage range and a second DC rail voltage output if the mains power (210) is within a second mains voltage range.

2. The rail voltage switching circuit of claim 1 wherein the converter (204) is selected from the group consisting of buck converters, boost converters, buck-boost converters, flyback converters, single ended primary inductor converters (SEPIC), and Cuk converters.

3. The rail voltage switching circuit of claim 1 wherein the DC rail voltage output (208) is a first DC rail voltage output if the mains power (210) is below a mains power setpoint and a second DC rail voltage output if the mains power (210) is above the mains power setpoint.

4. The rail voltage switching circuit of claim 1 wherein:
    the DC rail voltage output (208) changes from a first DC rail voltage output to the second DC rail voltage output as the mains power (210) increases past a first mains power setpoint;
    the DC rail voltage output (208) changes from a second DC rail voltage output to a third DC rail voltage output as the mains power (210) increases past a second mains power setpoint;
    the DC rail voltage output (208) changes from the third DC rail voltage output to the second DC rail voltage output as the mains power (210) decreases past the second mains power setpoint less a second offset; and
    the DC rail voltage output (208) changes from the second DC rail voltage output to the first DC rail voltage output as the mains power (210) decreases past the first mains power setpoint less a first offset.

5. The rail voltage switching circuit of claim 1 wherein the ballast microcontroller (214) generates a first power factor correction (PFC) voltage signal if the mains voltage signal (212) is in a first voltage range and generates a second power factor correction (PFC) voltage signal if the mains voltage signal (212) is in a second voltage range.

6. The rail voltage switching circuit of claim 1 wherein:
the DC rail voltage output (208) changes from a first DC rail voltage output to a second DC rail voltage output as the mains power (210) increases past a mains power setpoint; and
the DC rail voltage output (208) changes from the second DC rail voltage output to the first DC rail voltage output as the mains power (210) decreases past the mains power setpoint less an offset.

7. The rail voltage switching circuit of claim 6 wherein the offset is about 20–30 volts.

8. The rail voltage switching circuit of claim 1 wherein the DC rail voltage output (208) is a first DC rail voltage output if the mains power (210) is below a first mains power setpoint, the DC rail voltage output (208) is a second DC rail voltage output if the mains power (210) is between the first mains power setpoint and a second mains power setpoint, and a third DC rail voltage output if the mains power (210) is above the second mains power setpoint.

9. The rail voltage switching circuit of claim 8 wherein the first mains power setpoint is about 210–215 volts, the second mains power setpoint is about 255 volts, the first DC rail voltage output is about 400 volts, the second DC rail voltage output is about 450 volts, and the third DC rail voltage output is about 465–480 volts.

10. The rail voltage switching circuit of claim 1 wherein the converter (204) comprises:
a coil (218), the coil (218) having an input and an output, the input of the coil (218) receiving the mains power (210);
a power factor correction (224), the power factor correction (224) being responsive to the PFC voltage signal (214) and generating a PFC gate signal (230);
a switch (220), the switch (220) being operably connected to the output of the coil (218) and being responsive to the PFC gate signal (230) to generate modulated power (232); and
a rectifier (222), the rectifier (222) being responsive to the modulated power (232) to generate the DC rail voltage output (208).

11. The rail voltage switching circuit of claim 10 wherein the switch (220) provides a PFC current signal (234) and the power factor correction (224) is responsive to the PFC current signal (234).

12. The rail voltage switching circuit of claim 10 wherein the coil (218) provides a zero current input signal (236) and the power factor correction (224) is responsive to the zero current input signal (236).

13. A method of rail voltage switching for an electronic ballast comprising:
providing mains power (210);
determining voltage of the mains power (210);
determining a power factor correction (PFC) voltage signal (214) based on the voltage of the mains power (210); and
converting the mains power (210) to a DC rail voltage output (208) in response to the PFC voltage signal (214), the DC rail voltage output (208) being a first DC rail voltage output if the mains power (210) is within a first mains voltage range and a second DC rail voltage output if the mains power (210) is within a second mains voltage range.

14. The method of claim 13 further comprising:
changing the DC rail voltage output (208) from a first DC rail voltage output to the second DC rail voltage output as the voltage of the mains power (210) increases past a mains power setpoint; and
changing the DC rail voltage output (208) from the second DC rail voltage output to the first DC rail voltage output as the voltage of the mains power (210) decreases past the mains power setpoint less an offset.

15. The method of claim 13 further comprising:
changing the DC rail voltage output (208) from a first DC rail voltage output to the second DC rail voltage output as the voltage of the mains power (210) increases past a first mains power setpoint;
changing the DC rail voltage output (208) from a second DC rail voltage output to a third DC rail voltage output as the voltage of the mains power (210) increases past a second mains power setpoint;
changing the DC rail voltage output (208) from the third DC rail voltage output to the second DC rail voltage output as the voltage of the mains power (210) decreases past the second mains power setpoint less a second offset; and
changing the DC rail voltage output (208) from the second DC rail voltage output to the first DC rail voltage output as the voltage of the mains power (210) decreases past the first mains power setpoint less a first offset.

16. The method of claim 13 wherein determining a power factor correction (PFC) voltage signal (214) based on the voltage of the mains power (210) comprises:
generating a first power factor correction (PFC) voltage signal if the voltage of the mains power (210) is in a first voltage range; and
generating a second power factor correction (PFC) voltage signal if the voltage of the mains power (210) is in a second voltage range.

17. The method of claim 13 wherein converting the mains power (210) to a DC rail voltage output (208) in response to the PFC voltage signal (214) further comprises:
providing a coil (218), the coil (218) having an input and an output, the input of the coil (218) receiving the mains power (210);
generating a PFC gate signal (230) in response to the PFC voltage signal (214);
switching the output of the coil (218) in response to the PFC gate signal (230) to generate modulated power (232); and
rectifying the modulated power (232) to generate the DC rail voltage output (208).

18. The method of claim 17 further comprising:
determining a PFC current signal (234) from the switching the output of the coil (218); and
adjusting the PFC gate signal (230) in response to the PFC current signal (234).

19. The method of claim 17 further comprising:
determining current of the coil (218); and
switching the PFC gate signal (230) when the current of the coil (218) is about zero.

20. A system for producing a rail voltage switching for an electronic ballast comprising:
means for providing mains power (210);
means for determining voltage of the mains power (210);
means for determining a power factor correction (PFC) voltage signal (214) based on the voltage of the mains power (210); and
means for converting the mains power (210) to a DC rail voltage output (208) in response to the PFC voltage signal (214), the DC rail voltage output (208) being a first DC rail voltage output if the mains power (210) is within a first mains voltage range and a second DC rail voltage output if the mains power (210) is within a second mains voltage range.

21. The system of claim 20 further comprising:

means for changing the DC rail voltage output (208) from a first DC rail voltage output to a second DC rail voltage output as the voltage of the mains power (210) increases past a mains power setpoint; and means for changing the DC rail voltage output (208) from the second DC rail voltage output to the first DC rail voltage output as the voltage of the mains power (210) decreases past the mains power setpoint less an offset.

22. The system of claim 20 further comprising:

means for changing the DC rail voltage output (208) from a first DC rail voltage output to a second DC rail voltage output as the voltage of the mains power (210) increases past a first mains power setpoint;

means for changing the DC rail voltage output (208) from a second DC rail voltage output to a third DC rail voltage output as the voltage of the mains power (210) increases past a second mains power setpoint;

means for changing the DC rail voltage output (208) from the third DC rail voltage output to the second DC rail voltage output as the voltage of the mains power (210) decreases past the second mains power setpoint less a second offset; and means for changing the DC rail voltage output (208) from the second DC rail voltage output to the first DC rail voltage output as the voltage of the mains power (210) decreases past the first mains power setpoint less a first offset.

23. The system of claim 20 wherein the means for determining a power factor correction (PFC) voltage signal (214) based on the voltage of the mains power (210) comprises:

means for generating a first power factor correction (PFC) voltage signal if the voltage of the mains power (210) is in a first voltage range; and means for generating a second power factor correction (PFC) voltage signal if the voltage of the mains power (210) is in a second voltage range.

24. The system of claim 20 wherein the means for converting the mains power (210) to a DC rail voltage output (208) in response to the PFC voltage signal (214) further comprises:

a coil (218), the coil (218) having an input and an output, the input of the coil (218) receiving the mains power (210);

means for generating a PFC gate signal (230) in response to the PFC voltage signal (214);

means for switching the output of the coil (218) in response to the PFC gate signal (230) to generate modulated power (232); and means for rectifying the modulated power (232) to generate the DC rail voltage output (208).

25. The system of claim 24 further comprising:

means for determining a PFC current signal (234) from the switching the output of the coil (218); and means for adjusting the PFC gate signal (230) in response to the PFC current signal (234).

26. The system of claim 24 further comprising:

means for determining current of the coil (218); and means for switching the PFC gate signal (230) when the current of the coil (218) is about zero.

* * * * *